United States Patent [19]

Suzuki et al.

[11] Patent Number: 6,091,734
[45] Date of Patent: Jul. 18, 2000

[54] TELECOMMUNICATION NETWORK BASED ON DISTRIBUTED CONTROL

[75] Inventors: Shigehiko Suzuki, Tokyo; Shigeki Yamada, Tokorozawa; Minoru Kubota, Tokyo, all of Japan

[73] Assignee: Nippon Telegraph and Telephone Corporation, Japan

[21] Appl. No.: 08/933,783

[22] Filed: Sep. 19, 1997

[30] Foreign Application Priority Data

Sep. 20, 1996 [JP] Japan ..................................... 8-249985

[51] Int. Cl.⁷ ............................. H04M 7/00; H04M 1/66; H04M 1/68; H04M 3/16
[52] U.S. Cl. ............................................ 370/410; 379/229
[58] Field of Search ..................................... 370/389, 395, 370/396, 397, 401, 399, 400, 410, 352, 353, 354; 379/219, 220, 229, 230, 231, 232, 234, 240

[56] References Cited

U.S. PATENT DOCUMENTS

| | | | |
|---|---|---|---|
| 4,747,130 | 5/1988 | Ho ............................................. | 379/269 |
| 5,388,096 | 2/1995 | Westberg ................................. | 370/375 |
| 5,488,501 | 1/1996 | Barnsley .................................. | 359/137 |
| 5,509,123 | 4/1996 | Dobbins et al. ......................... | 370/389 |
| 5,848,128 | 12/1998 | Frey ........................................ | 379/230 |
| 5,867,571 | 2/1999 | Borchering .............................. | 379/230 |
| 5,909,430 | 6/1999 | Reaves .................................... | 370/254 |
| 5,940,491 | 8/1999 | Anderson et al. ....................... | 379/230 |

FOREIGN PATENT DOCUMENTS

| | | |
|---|---|---|
| 0 690 651 A2 | 1/1996 | European Pat. Off. . |
| 62-188590 | 8/1987 | Japan . |
| 5-268254 | 10/1993 | Japan . |

OTHER PUBLICATIONS

Higgins, "A Survey of Bell System Progress in Electronic Switching," The Bell System Technical Journal, vol. XLIV, No. 6, Jul.–Aug. 1965, pp. 937–997.

Habara et al., "DEX–R1, DEX–R3 Electronic Switching Systems," Electrical Communication Laboratory Technical Journal, 1974, pp. 955–1015 No Month.

Shimizu et al., "Low Latency Message Communication Support for the AP1000," PIOC 19th International Symposium on Computer Architecture, 1992, pp. 288–297 No Month.

Kogiku et al., "Distributed Object–Oriented Network Architecture DONA: Design Concepts," Information and Communication Engineers, Mar. 27, 1996.

Suzuki et al., "DONA: A Distributed Object–Oriented Network Architecture," The Institute of Electronics, Information and Communication Engineers, Technical Report of IEICE, Sep. 24, 1996, pp. 25–30.

*Primary Examiner*—Huy D. Vu
*Assistant Examiner*—Kevin C. Harper
*Attorney, Agent, or Firm*—Pennie & Edmonds LLP

[57] ABSTRACT

A telecommunication network based on distributed control, comprising a plurality of switch nodes having switch fabric devices containing switches for exchanging user information between subscriber lines and trunk lines, and signal devices for sending and receiving control signals through the subscriber lines and the trunk lines; a plurality of control nodes for controlling the switch nodes by sending and receiving control messages with the switch nodes; a control network for performing mutual message communications between the switch nodes and the control nodes; and an user information network for transferring the user information; wherein the control network connects the switch nodes and the control nodes by connection-type or connectionless communications, the control nodes and the switch nodes send and receive messages for communicating with other nodes through the control network, and each of the control nodes controls a plurality of switch nodes based on the control network routing messages to specified destination nodes in accordance with routing information in the messages.

11 Claims, 13 Drawing Sheets

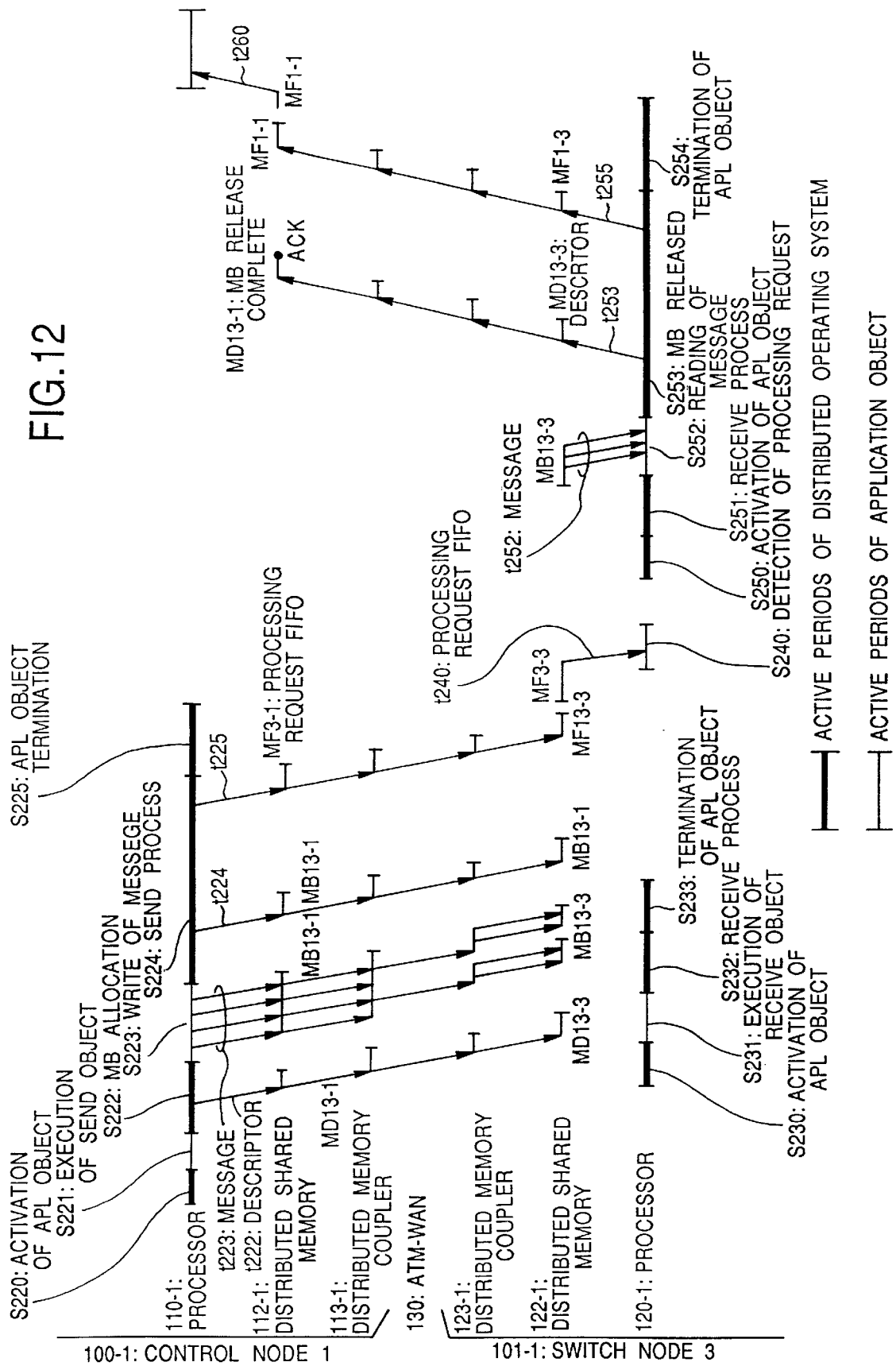

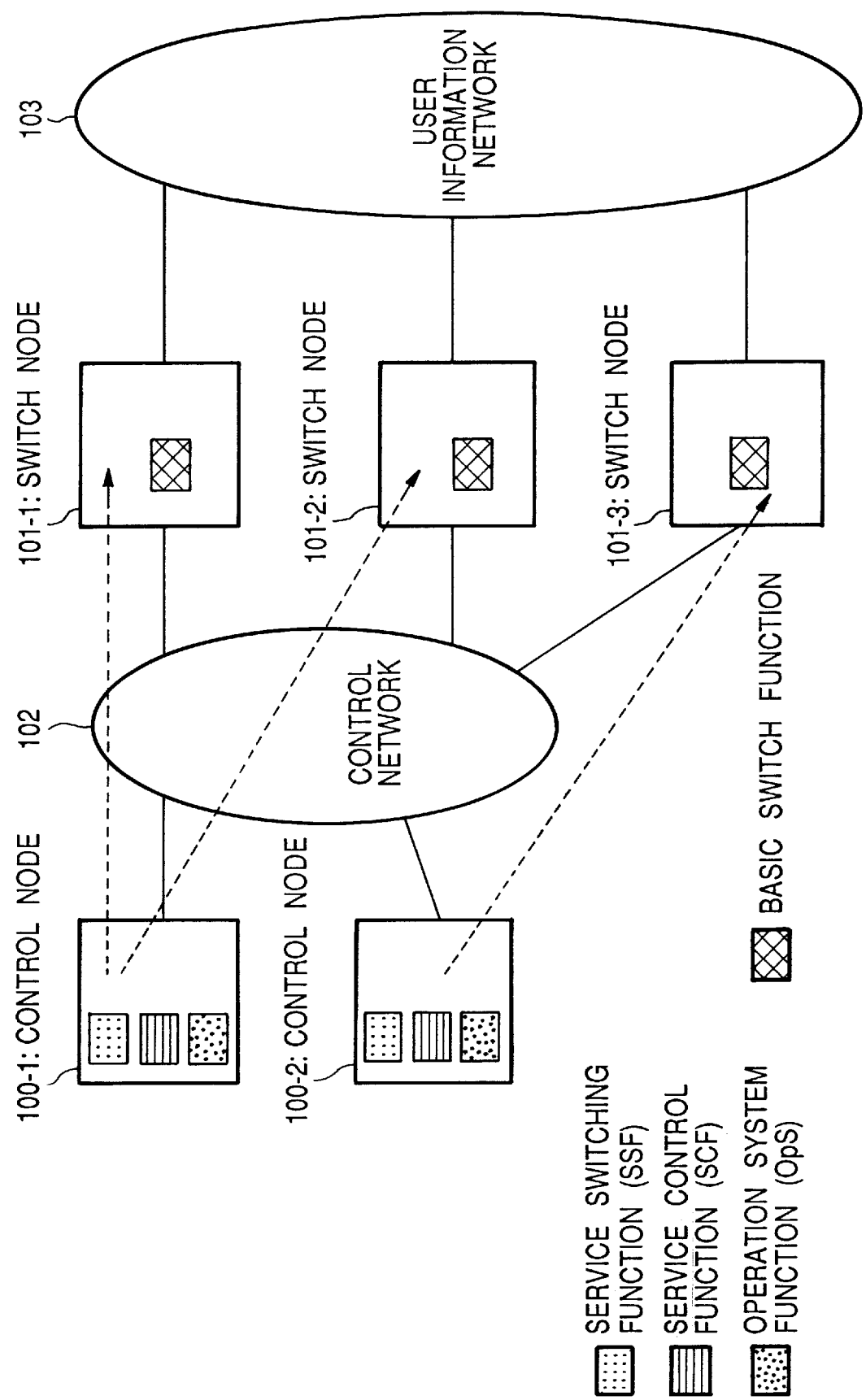

TELECOMMUNICATION NETWORK BASED ON DISTRIBUTED CONTROL

BACKGROUND OF THE INVENTION

1. Field of the Invention

The present invention relates to a telecommunication network based on distributed control which enables the construction of an economical and highly flexible telecommunication network even if there is a large number of switch subsystem nodes, by separating the control subsystems and switch subsystems of a switch node system and freely distributing their arrangement inside the network.

This application is based on patent application No.Hei8-249985 filed in Japan, the content of which is incorporated herein by reference.

2. Background Art

In conventional switch node systems, the switch subsystem and the control subsystem for controlling the switch subsystem are provided on a single node. While there are system organization wherein the control subsystem and the switch subsystem are provided on separate nodes (the node in which the control subsystem is provided is referred to as the "central office" and the node in which the switch subsystem is provided is referred to as the "remote office"), these have the control subsystem and the switch subsystem permanently connected by a dedicated line, thus making it impossible to make connections other than those which are set. Hence, such system organization are not sufficiently flexible to be applied to situations in which dynamic connections of the remote offices is required, situations of dynamic switching to other central offices in failure of the central office, and situations wherein the central office is merged into the remote office side to solely control the enlarged switch subsystem by a control subsystem.

FIG. 2 is a diagram showing an example of the structure of a conventional switch node system, and FIG. 3 is a diagram showing an example of a conventional remote controlled switching system.

A conventional switch node 1 comprises a switch fabric device 4 for switching multimedia information such as audio or data between a subscriber lines 2 and a trunk lines 3, and a controller 5 for sending various control orders to the switch fabric device 4 to perform connection operations. While the controller 5 uses a high-performance processor in order to simultaneously control multiple subscriber lines 2 and trunk lines 3, since such high-performance processors have extremely high processing capacity, the processing capacity often exceeds that required by the switch fabric device 4, thus resulting in surplus processing capacity.

Therefore, remote controlled switching system organizations have been proposed as shown in FIG. 3 wherein a plurality of switch fabric devices 6-1, 6-2, . . . 6-n are each positioned near subscribers and these are remotely controlled by a single controller 7. Examples of such remote controlled switching systems are described in "A Survey of Bell System Progress in Electronic Switching"; *The Bell System Technical Journal*, pp. 937–997, July–August 1965 and Habara, Goto and Suzuki, "DEX-R1 and DEX-R3 Electronic Switching Systems", *Kenkyuu Jitsuyouka Houkoku*, Vol. 23, No. 5, pp. 955–968 (1974).

FIG. 4 is a diagram showing an example of a conventional remotely controlled switching system, described in the Habara's reference.

In FIG. 4, reference numeral 10 denotes a central office having various control-related devices, reference numeral 11 denotes a central controller generally referred to as a "processor" for executing connection control programs to control remote offices 20-1, 20-1, . . . , 20-n, reference numeral 12 denotes a main memory for storing connection control programs and their control data, reference numeral 13 denotes a channel multiplexer activated by the central controller 11 for controlling data transfer between the main memory 12 and a remote controller 15, reference numerals 14-1 and 14-2 denote general subchannels for transferring data between the main memory 12 and the remote controller 15, reference numeral 15 denotes a remote controller for executing data transfer between the central office 10 and the plurality of remote offices 20-1, 20-2, . . . , 20-n, reference numerals 16-1, 16-2, . . . , 16-n denote control information links which make one-to-one connections over dedicated lines between the central office 10 and the plurality of remote offices 20-1, 20-2, . . . , 20-n, and 20-1, 20-2, . . . , 20-n are remote offices which are remotely located with respect to the central office 10 and contain the various devices of the switch subsystem. Additionally, inside the remote office 20-1, reference numeral 21 denotes a remote office data sender-receiver for transmitting and receiving data with the central office 10, reference numeral 22 denotes a switch fabric device, reference numeral 23 denotes a switch fabric for conveying information such as audio data, and reference numeral 24 denotes a switch controller for receiving data from the remote office data sender-receiver 21 and sending control orders to the switch fabric 23 or receiving data from the switch fabric 23.

Hereinbelow, when referring to devices such as the remote offices 20-1, 20-2, . . . , 20-n which have identical structures, the suffixes (such as -1 and -2) shall be omitted from the reference numerals when they are unnecessary for the purposes of describing the invention.

FIG. 5 is a diagram showing a conventional switch control method.

A method for controlling a plurality of remote offices 20 with a single central office 10 using the structure shown in FIG. 4 shall be explained. FIG. 5 shows a send mode wherein control data are sent from the central office 10 to the remote offices 20, and a receive mode wherein control data are read from the remote offices 20 by the central office 10.

First, under direct control, in other words when the controller 5 and the switch fabric device 4 are integrated on a single switch node such as shown in FIG. 2, in the send mode, a drive order is sent from the controller 5 to the switch fabric device 4 by the controller 5 executing a switch fabric control dedicated instruction (DTO instruction) 30 which includes a drive order for controlling the switch fabric device 4 or a switch fabric control dedicated instruction (DTO instruction) 31 which indirectly designates a drive order 32. The switch fabric device 4 receives, interprets and executes the control order, and upon completion of the procedure, the controller 5 receives a completion signal from the switch fabric device 4 to complete the execution of the instruction. In this way, the dedicated instructions 30 and 31 are executed basically in the same way as a memory write access instruction.

On the other hand, under remote control, in other words when the controller and the switch fabric devices are remotely located as shown in FIG. 3, in the send mode, a drive order 43 is basically sent by an input/output channel command. That is, the central controller 11 of the central office 10 executes an input-output instruction (SIO instruction) 40 and activates the channel multiplexer 13. The channel multiplexer 13 sequentially reads a command address word (CAW) 41 and a channel command (CCW) 42 from the main memory 12, and activates the general subchannel 14-1. The general subchannel 14-1 reads the switch fabric drive order 43 from the area in the main memory 12 designated by the CCW 42 and sends the switch fabric drive order 43 to the remote controller 15. The remote controller 15 sends the drive order 43 to the remote office data sender-receiver 21 via the control information link 16-1. The remote office data sender-receiver 21 transfers the drive order 43 to the switch controller 24, the switch controller 24 checks and interprets the drive order 43, and the switch fabric 23 is made to perform the desired switching operation. Once the switching operation is completed, the remote office data sender-receiver 21 returns an execution completion signal to the remote controller 15 via the control information link 16-1. When the remote controller 15 sends an execution completion signal to the general subchannel 14-1, the channel multiplexer 13 causes an interrupt to the central controller 11. The central controller 11 analyzes the cause of the interrupt to find that the execution of the switch fabric drive order has been completed. The designation of which of the plurality of remote offices 20 are to be controlled is done by the channel number field of the channel instruction 40. Thus, a single central office 10 is capable of transferring control information between a plurality of remote offices 20 by using sets of CAW 41, CCW 42 and switch fabric drive order 43 which are different for each channel number.

Next, in the case of the receiving mode (data transfer from the switch subsystem to the control subsystem) under direct control (control subsystem and switch subsystem housed in the same node), a dedicated instruction (DTN instruction) 52 indirectly designating a scan order 53 or a dedicated instruction (DTN instruction) 50 including a scan order for the switch subsystem are executed by the controller 5 of FIG. 2. Due to the execution of the DTN instruction, the internal status of the switch fabric device 4 is read and written into the scan result area 51 or 54.

On the other hand, in the receive mode under remote control, the switch fabric scan results are read by a method similar to the case of the send mode under remote control, that is, by execution of an input-output channel command. Specifically, the central controller 11 in FIG. 4 executes the input-output instruction (SIO instruction) of FIG. 5 and activates the channel multiplexer 13. The channel multiplexer 13 sequentially reads the command address word CAW 61 and the channel command CCW 62 in the main memory 12, then reads a scan order 63 from the main memory 12 by the first command CTL of the channel command CCW 62, then sends the scan order 63 to the remote controller 15 via the general subchannel 14-1. The remote office data sender-receiver 21 transfers the scan order 63 to the switch controller 24, and the switch controller interprets and executes the scan order 63 to read the internal status of the switch fabric 23 and return the scan results to the remote office data sender-receiver 21. Due to the remote office data sender-receiver 21 returning the scan results to the remote controller 15 via the control information link 16-1, the general subchannel 14-1 completes the execution of the command CFL and initiates the execution of the next command RCM in the channel command CCW 62. In accordance with the command RCM, the scan results received from the remote controller 15 are written into the designated scan result area 64 in the main memory 12. As the command RCM requires "n"-times read accesses by sending the read requests to and receiving the replay data from the remote office 16-1 over the control information link 16-1, the space propagation delay will increase with the distance between the central office 10 and the remote office 16-1. Once the writing into the scan result area 64 is completed, the channel multiplexer causes an interrupt in the central controller 11. The central controller 11 analyzes the cause of the interrupt to find that the execution of the switch fabric scan order has been completed.

FIG. 6 is a diagram showing a conventional identification method for multiple switch fabrics.

In FIG. 6 the same program is used in a central office to identify and select control data (referred to as primary data) corresponding to each of the plurality of remote offices 20.

First, an area in the main memory 12 is divided into areas 71 and 72 of fixed sizes corresponding to the remote offices, and the data structures are made to be identical between the remote offices. For example, in FIG. 6, reference numeral 71 denotes a data area (#1 office primary data area) corresponding to remote office 20-1, reference numeral 72 denotes a data area (#2 office primary data area) corresponding to remote office 20-2, and the data areas 71 and 72 are given the same data structure. Next, the connection control program in the central office 10 is shared between the remote offices 20-1 and 20-2. The connection control program includes a primary office data access instruction 70 whose base address register field 74 specifies the top address of the primary office data area. For example, when controlling the remote office 20-1, the top address (b1 in FIG. 6) of the #1 office primary data area 71 is preloaded. Additionally, controlling the remote office 20-2, the top address (b2 in FIG. 6) of the #2 office primary data area 72 is preloaded. By switching the value of the base register over time by dividing into time intervals for controlling each remote office such as by entering the value of b1 into the base register in one time interval and entering the value of b2 at a different time interval, it is possible to control a plurality of remote offices 20 on a time-shared basis.

The above mentioned remote control switching system is considered as one type of the distributed switching system and the other type of distributed switching system is a LAN(Local Area Network)-based distributed switching system in which the controller and the switch fabric devices are connected not by dedicated lines as in a remote control switching system, but instead are connected by a LAN (Local Area Network) has been proposed. In this distributed switching system, call connection control is performed under the cooperation of the controller (central processing-management module) and the switch fabric devices (switching modules) by sending and receiving through a LAN (Japanese Patent Application, First Publication No. Sho 62-188590).

All these direct control and remote control switching systems and LAN-connected distributed switching systems have the following problems.

(1) In the structure shown in FIG. 4, the central office 10 and the remote offices 20 are connected one-to-one by the dedicated lines 16, thus requiring general subchannels 14, dedicated lines 16 and remote office transmitter-receivers 21 to be provided in numbers proportional to the number of remote offices being controlled, and also requiring the channel multiplexer 13 and the remote controller 15 to be expanded to accommodate the number of remote offices. For this reason, if the number of remote offices becomes too numerous, the overall network requires an extremely large number of devices, hence greatly increasing the cost.

(2) Additionally, since the control subsystem and the switch subsystem are permanently connected by means of dedicated lines, it is not possible to make any connections other than those which are set up. For example, the system is not flexible enough to perform dynamic connections of the remote offices with low usage to share control information links and reduce the network cost, or to dynamically switch to other central offices when the central office is down.

(3) Additionally, the communication means or methods for the case of direct control in which the controller and the switch fabric devices are in the same node and the case of remote control in which the controller and the switch fabric devices are located remotely are different, so that the application program must include separate codes for direct control and remote control. This courses high development cost and low flexibility.

(4) Furthermore, since the control data is transferred through channel commands in the case of remote control, the software overhead for the preparation, activation and interrupt processing for channel commands is large and inefficient.

(5) Also, since the transmission of data between the remote controller 15 of the central office and the remote office data sender-receivers 21 of the remote offices is performed by the remote read access command, such as the RCM command in the case of remote control, the time delay due to spatial propagation increases as the distance between the central office and the remote offices increases, thus extending the waiting time until the remote controller 15 receives confirmation signals from the remote office data sender-receivers 21 so as not to allow shifting to the next data transmission. In this way, the decrease in performance is considerable in the case of remote control over long distances.

(6) Furthermore, as a conventional method for identifying and controlling a plurality of switch fabric devices, the designation of channel numbers 40 and 60 as shown in FIG. 5 and the switching of control data by switching the value of the base register (b) as shown in FIG. 6 are combined. However, when designating channel numbers, the number of remote offices capable of being controlled is limited by the length of the channel number field, and in the base register switching method the data configurations of the switch fabric devices must be made completely identical, thus making this system unsuitable for general applications and poor in flexibility.

(7) Additionally, in switching systems connected by LANs, the switching system is distributed over a range covered by a LAN by dividing the system into a plurality of modules such as a switching module and a central processing module. Even if these distributed systems are introduced in the network, the network structure is still the same as the one, constructed form conventional switch system. Each switching systems are self-contained and independent of each other, thus giving the network overall an inflexible structure which is unsuitable for general applications and poor in flexibility.

(8) Furthermore, in switching systems connected by LANs, the network is constructed under the assumption of confinement to a local area, so that there are a variety of restrictions such as restrictions to the number of modules able to communicate and the distance between modules.

SUMMARY OF THE INVENTION

The object of the present invention is to offer a telecommunication network based on distributed control which resolves such conventional problems, with flexibility such as to allow arbitrary control nodes and switch nodes to be flexibly connected, with low communication overhead between the controller and the switch fabric devices, and wherein the decrease in performance is small in the case of remote control even if the distance between the control nodes and the switch nodes is large.

For this purpose, the present invention offers a telecommunication network based on distributed control comprising a plurality of switch nodes having switch fabric devices containing switches for exchanging user information between subscriber lines and trunk lines, and signal devices for sending and receiving control signals through the subscriber lines and the trunk lines; a plurality of control nodes for controlling the switch nodes by sending and receiving control messages with the switch nodes; a control network for performing message communications between the switch nodes and the control nodes; and an user information network for transferring the user information; wherein the control network connects the switch nodes and the control nodes by connection-type or connectionless communications, the control nodes and the switch nodes send and receive messages for communicating with other nodes through the control network, and each of the control nodes controls a plurality of switch nodes by delivering messages to the destination nodes, specified by routing information in the messages.

According to this structure, each control node is connected to all of the switch nodes by means of the control network, thereby enabling connections to be established between arbitrary nodes as needed, and allowing the construction of a highly economical and flexible telecommunication network based on distributed control, even if there is a large number of switch nodes to be controlled.

BRIEF DESCRIPTION OF THE DRAWINGS

FIG. 12 is a timing chart for transferring messages between nodes in the present invention.

FIG. 13 is a diagram showing the relationship between the service switching function, service control function and operation system function in the control nodes of the present invention.

DESCRIPTION OF PREFERRED EMBODIMENTS OF THE INVENTION

Hereinbelow, embodiments of the present invention shall be explained in detail with reference to the drawings.

Figure 1:
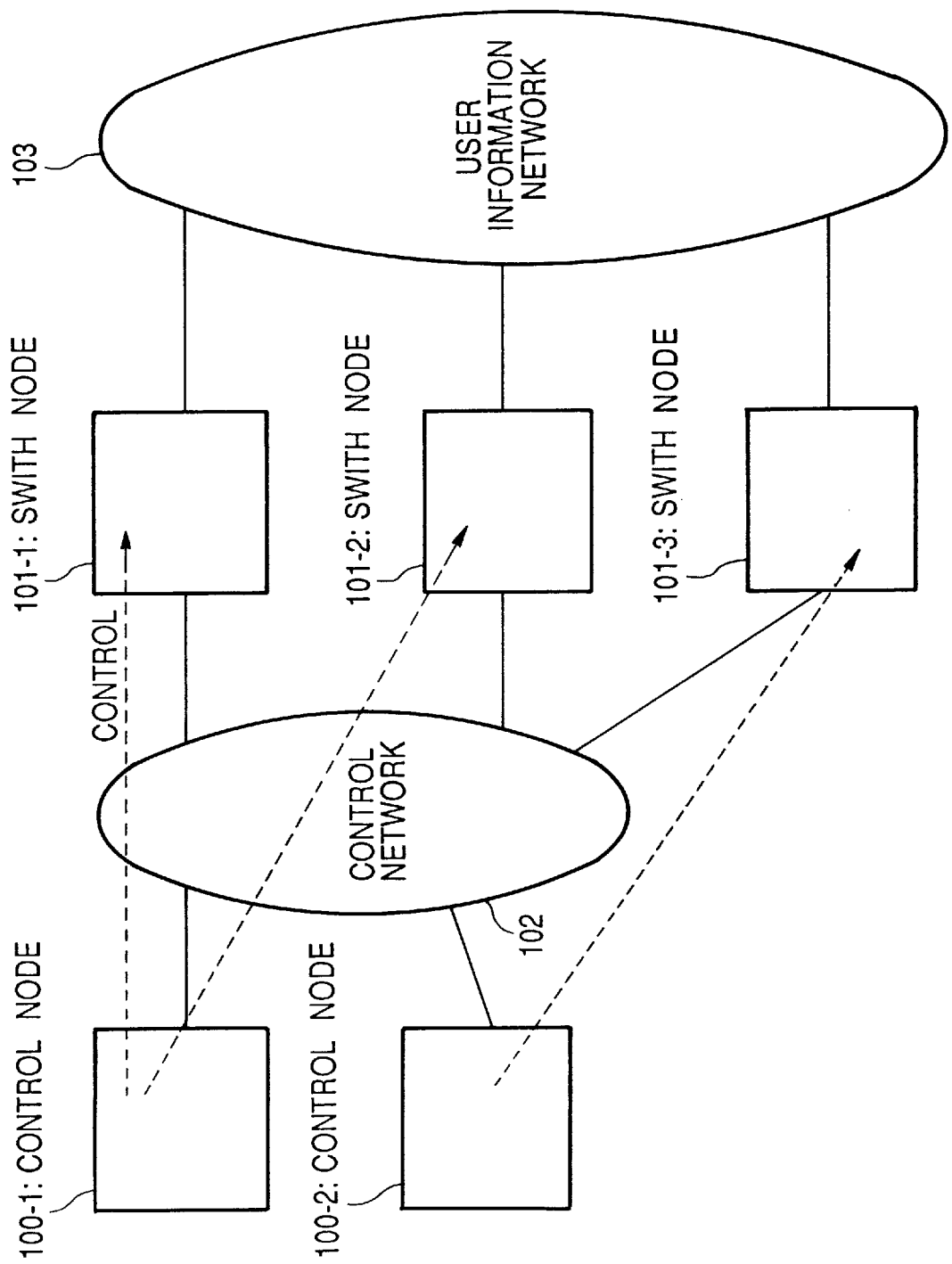
FIG. 1 is a diagram showing an example of the structure of a telecommunication network based on distributed control according to an embodiment of the present invention.
Figure 2:
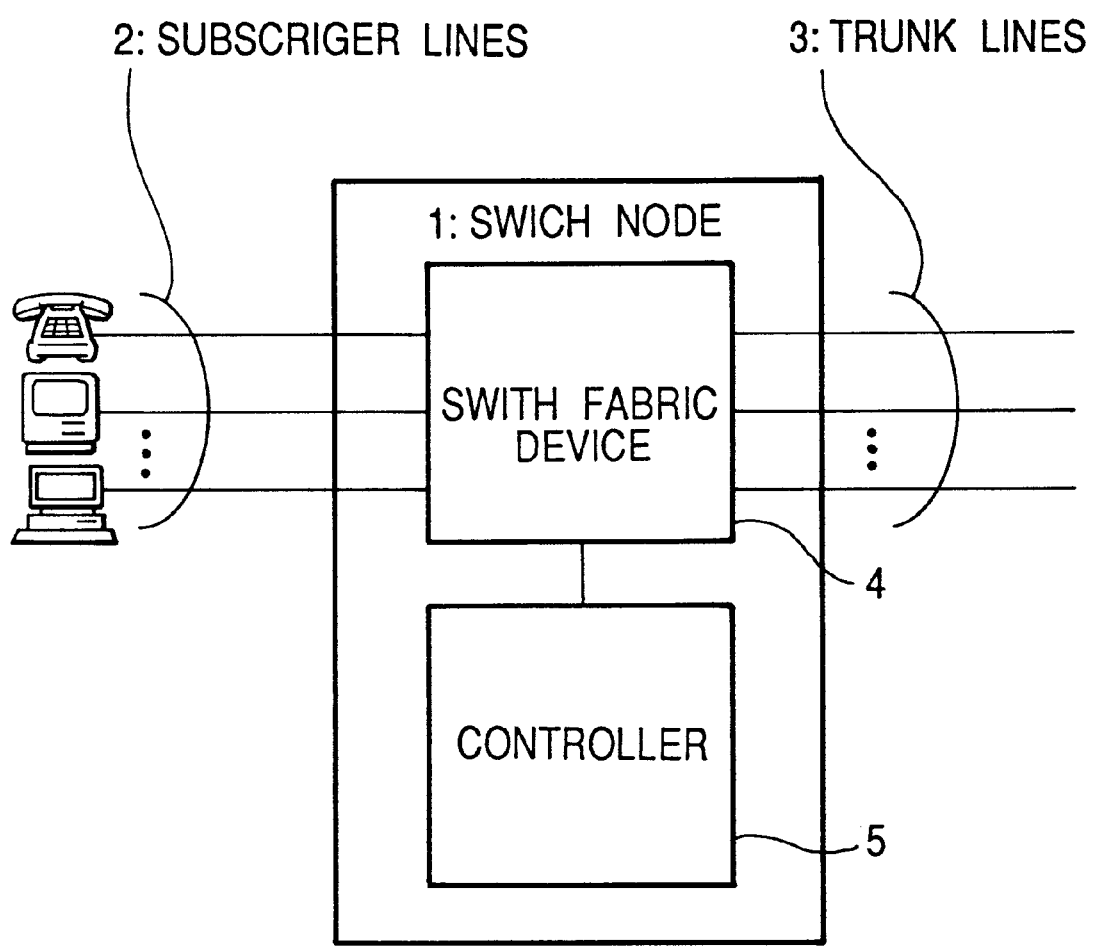
FIG. 2 is a diagram showing an example of the structure of a conventional switch node.
Figure 3:
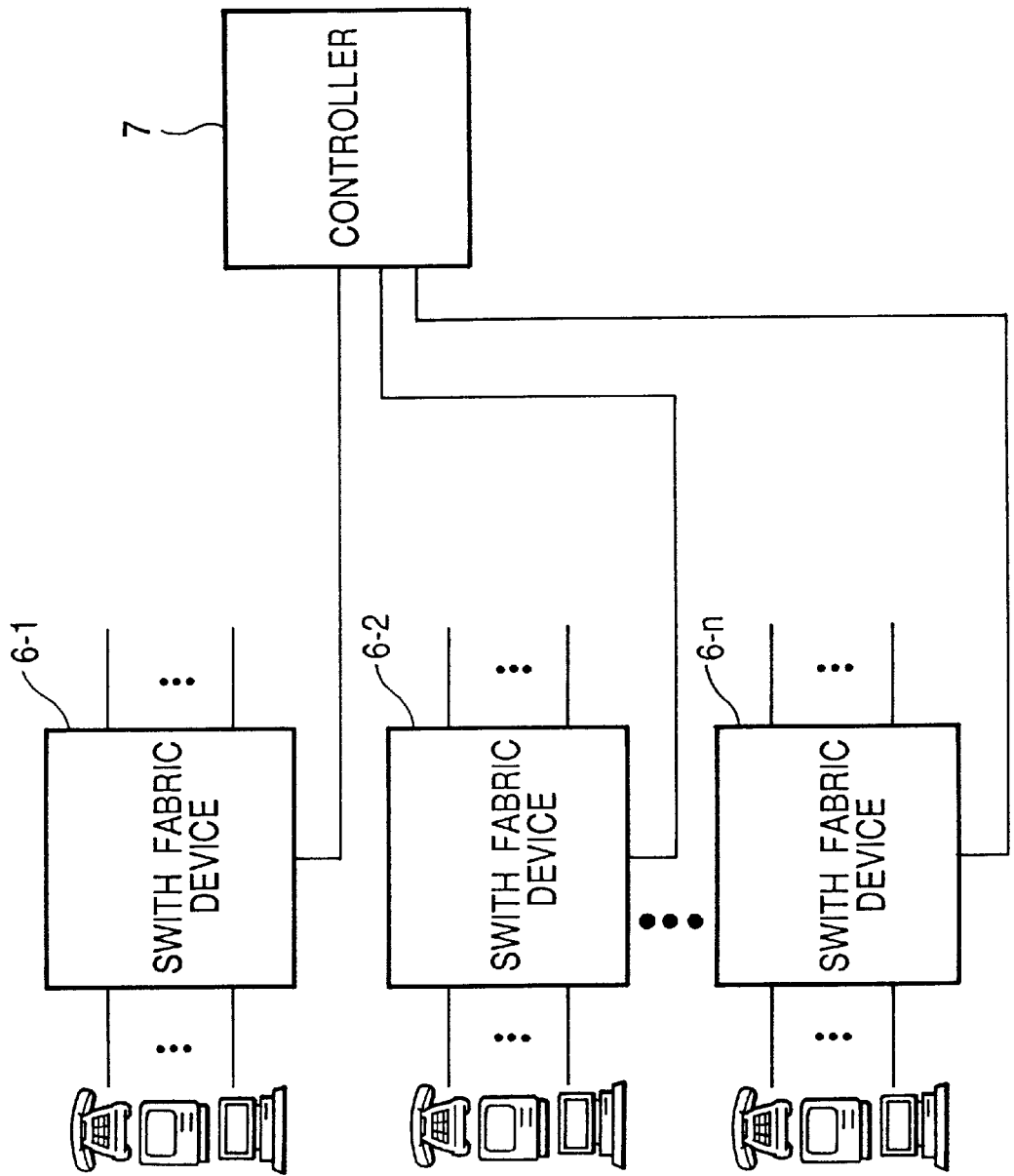
FIG. 3 is a diagram showing an example of the structure of a conventional remote control switching system.
Figure 4:
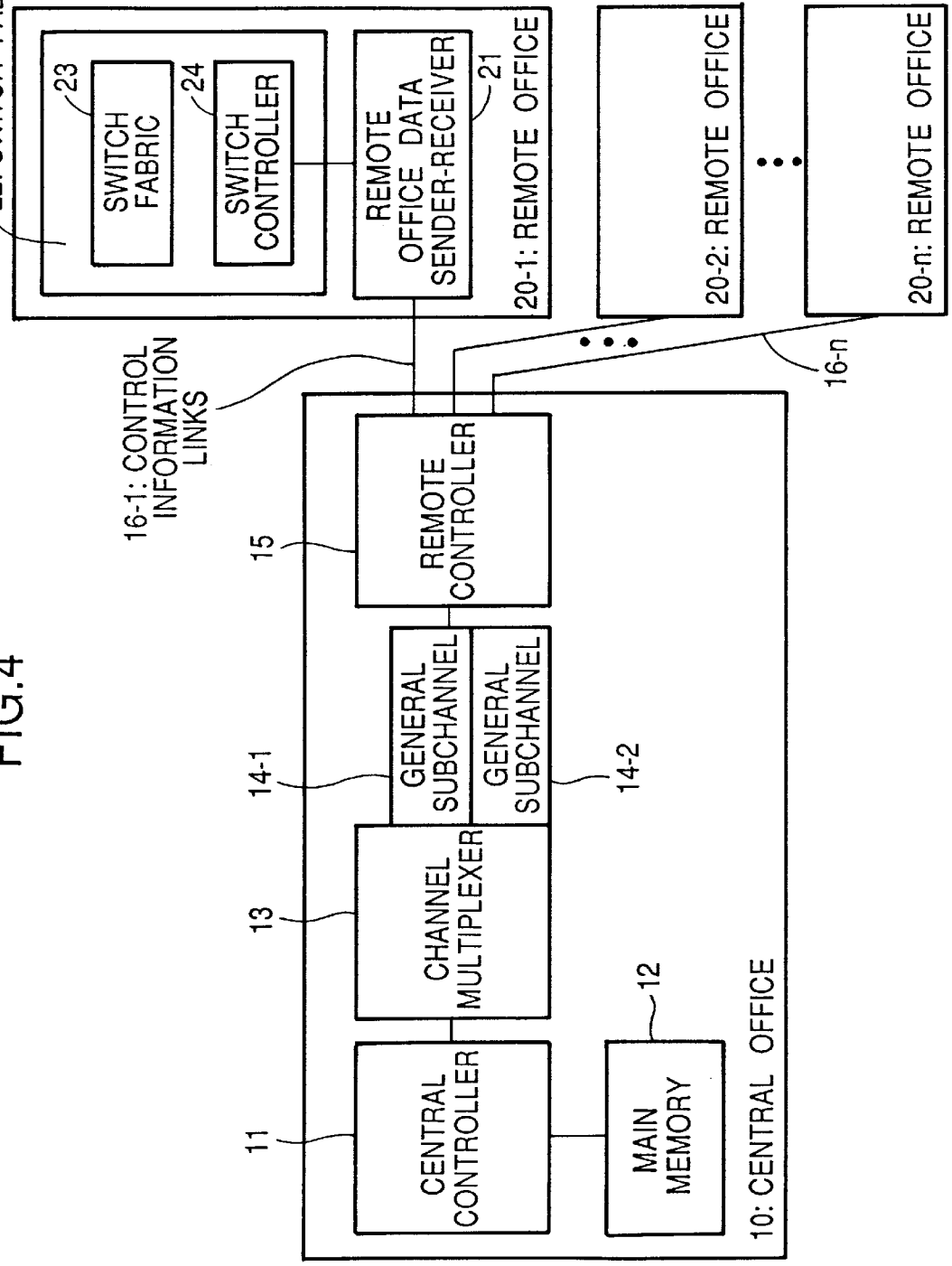
FIG. 4 is a diagram showing an example of a conventional remote control switching system for controlling a plurality of remote offices by a single central office.
Figure 5:
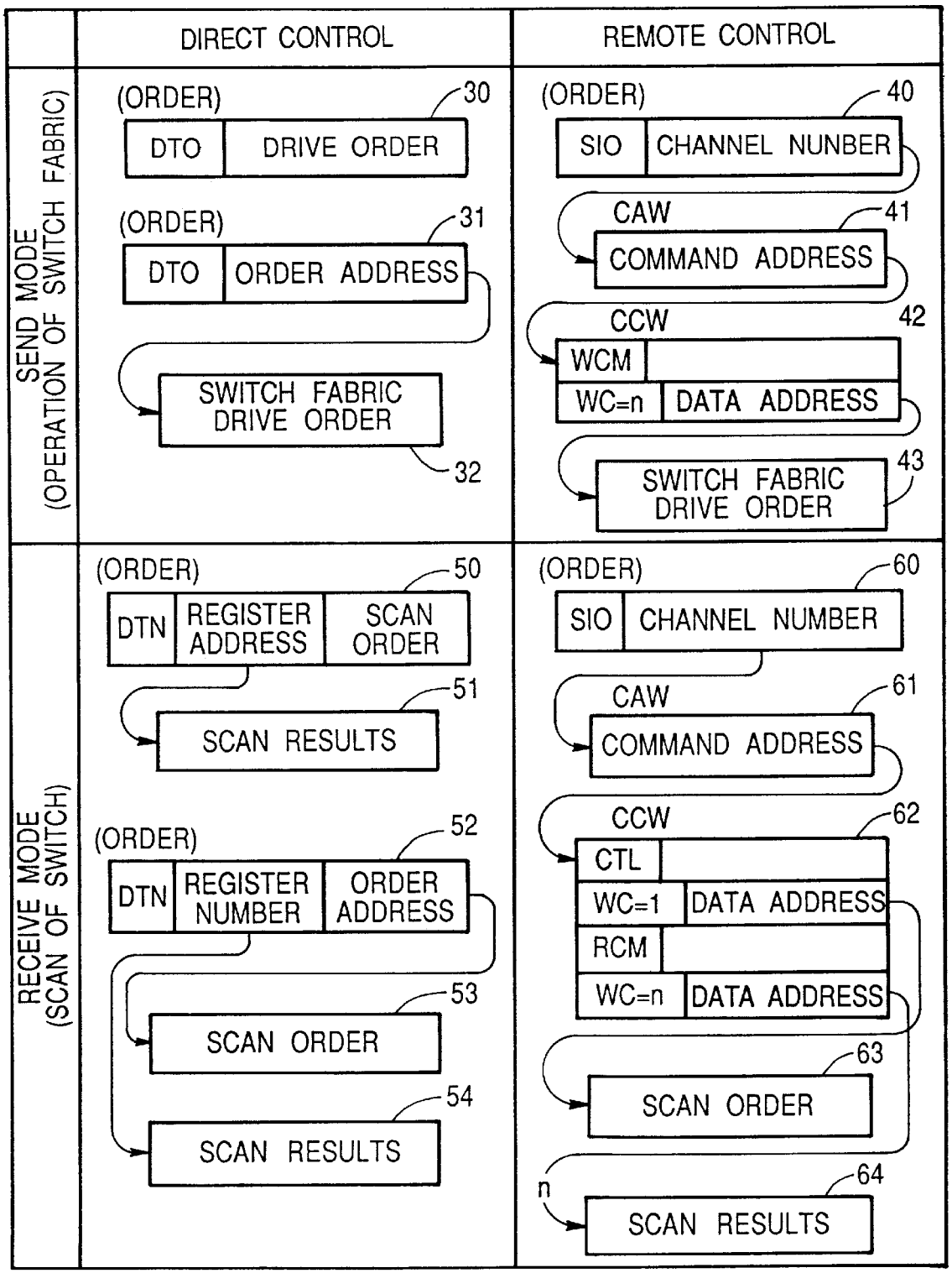
FIG. 5 is a diagram for explaining a conventional switch subsystem control method.
Figure 6:
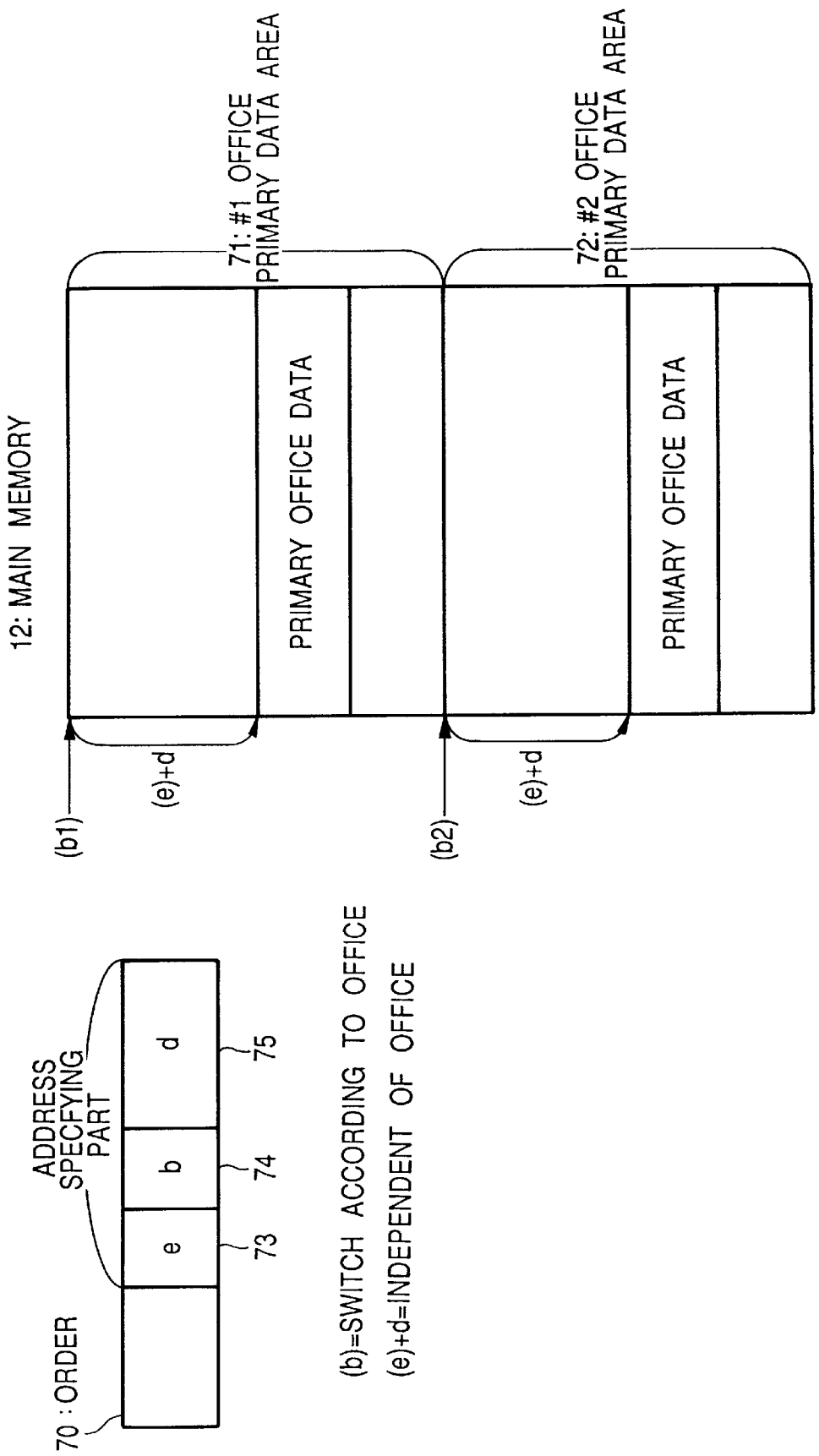
FIG. 6 is a diagram for explaining a conventional method for identifying a plurality of switch subsystems.

FIG. 1 is a diagram showing the basic structure of a telecommunication network based on distributed control according to an embodiment of the present invention.

In FIG. 1, reference numerals 100-1 and 100-2 denote control nodes, reference numerals 101-1, 101-2 and 101-3 denote switch nodes, reference numeral 102 denotes a control network for interconnecting all of the control nodes and switch nodes in order to send and receive control messages, and reference numeral 103 denotes a user information network for interconnecting the switch nodes in order to transport multimedia information such as audio, data images and video therebetween. Each network is assumed to be an ATM-WAN (Asynchronous Transfer Mode—Wide Area Network), with the control nodes and switch nodes being connected by PVCs (Permanent Virtual Channels) or SVCs (Switched Virtual Channels). For example, in a normal state, the control node 100-1 controls the switch nodes 101-1 and 101-2, and the control node 100-2 controls the switch node 101-3 (the dotted lines indicate the direction of control).

Figure 7:
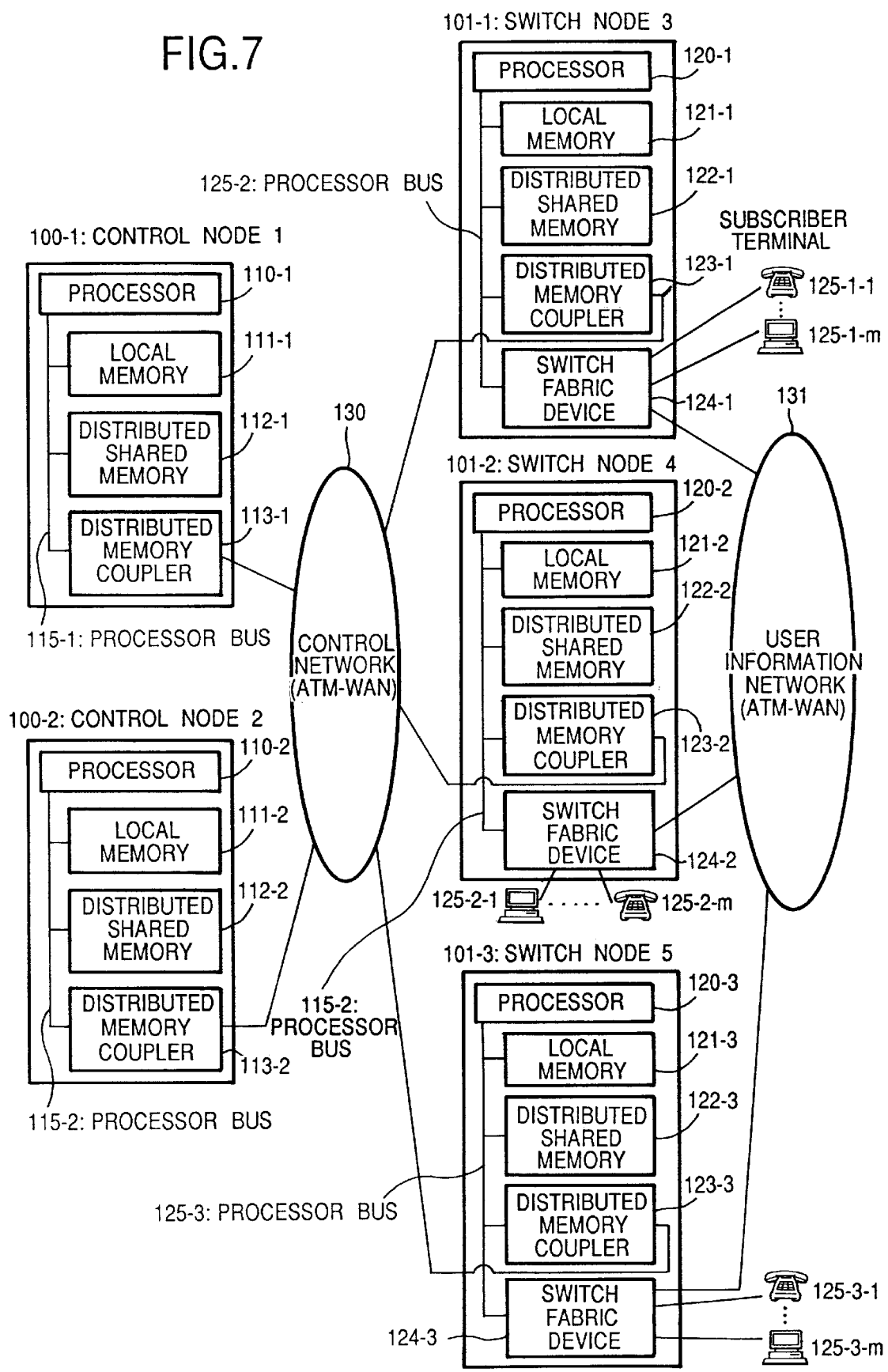
FIG. 7 is a diagram showing the structure of a first embodiment of a telecommunication network based on distributed control according to the present invention.

FIG. 7 is a diagram showing the structure of a network according to a first embodiment of the present invention, which shows a more detailed version of the telecommunication network based on distributed control shown in FIG. 1.

The control node 100-1 comprises the following elements. First, 110-1 denotes a processor for executing switching programs in real-time or operation programs in non-real-time, 111-1 denotes a local memory for storing switching programs, non-real-time operation programs, data related thereto, and a distributed OS (Operating System) which sends and receives control messages between nodes in a location-independent manner, enabling messages to be sent by the same method wherever the destination node is, and reference numeral 112-1 denotes a distributed shared memory provided with a message buffer for storing messages which are transmitted between the control nodes and switch nodes, the address space of which is shared with the address spaces of the distributed shared memories of other control nodes and switch nodes. Reference numeral 113-1 denotes a distributed memory coupler having the function of copying and transferring data written on the distributed shared memory 112-1 to other control nodes or switch nodes which share the address. Reference numeral 115-1 denotes a processor bus for connecting the processor 110-1 with other devices. The control node 100-2 is identical to control node 100-1, with the suffix simply changed from -1 to -2. In the following description, the suffixes shall be omitted when there is no need to discriminate between the components in each node.

On the other hand, the structure of the switch node 101-1 has a switch fabric device appended to the structure of a control node 100-1. That is, reference numeral 120-1 is a relatively low-cost processor having a hardware structure basically identical to the processor 110 of the control node 100, and having software for executing switch objects by performing various types of switch fabric controls in real-time or non-real-time. Reference numeral 121-1 denotes a local memory, reference numeral 122-1 denotes a distributed shared memory, reference numeral 123-1 denotes a distributed memory coupler, and reference numeral 124-1 denotes a switch fabric device. The switch fabric device 124-1 is connected to m subscriber terminals 125-1-1, . . . , 125-1-m and is also connected to the user information network 131. The other switch nodes 101-2 and 101-3 have the same structure as the switch node 101-1, with the suffixes simply changing from -1 to -2 and -3.

Reference numeral 130 denotes a control network and reference numeral 131 denotes a user information network, which are both composed of ATM-WANs (Asynchronous Transfer Mode—Wide Area Networks). ATM is a switching and transmission technology wherein messages, information to be transmitted, are divided into fixed lengths (for example, 48 bytes in AAL(ATM Adaptation Layer)-5 for signal transmission), and 5-byte headers are appended to each of these to form 53-byte ATM cells, and these cells are transmitted by self-routing mechanism. The ATM cell header includes VPI (Virtual Path Identifier) and VCI (Virtual Channel Identifier) data to indicate a destination of the cell. Additionally, the ATM network has a self-routing function and sending the cell to the destination node by reading the VPI and VCI of each cell. Furthermore, aside from a PVC (Permanent Virtual Channel) connection wherein the communication partner is fixed, in other words a connection is established even when there are no actual communications, the control ATM-WAN 130 and the user information ATM-WAN 131 also have a SVC (Switched Virtual Channel), in other words a function of logically connecting endpoints in accordance with connection requests from the source. The SVC makes connections between the sender side nodes which send messages and the receiver side nodes which receive messages by exchanging control data according to a signalling protocol such as Q2931 which is an internationally standard protocol for transmitting control signals at the high layers of an AAL.

Figure 8:
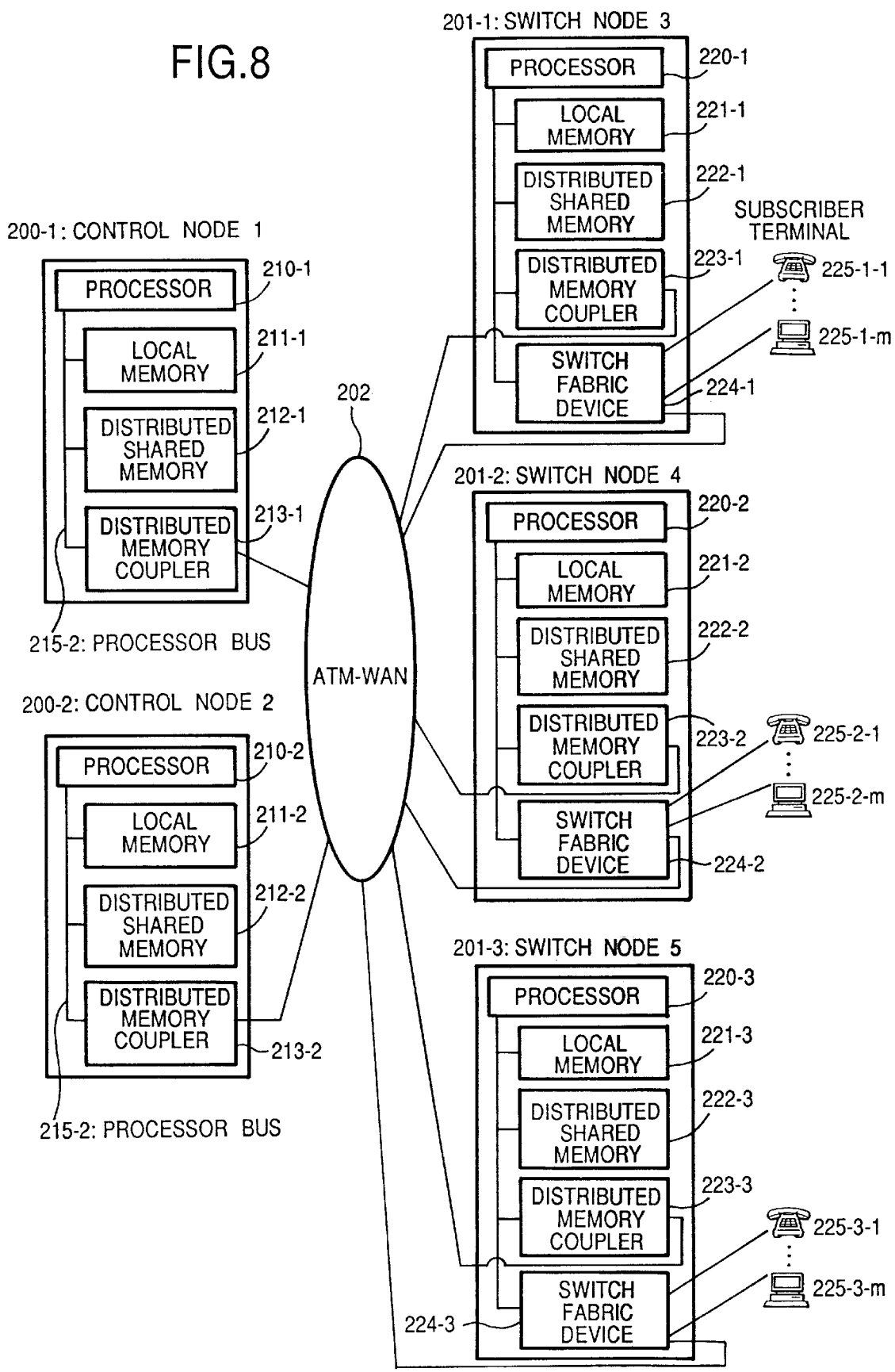
FIG. 8 is a diagram showing the structure of a second embodiment of a telecommunication network based on distributed control according to the present invention.

FIG. 8 is a diagram showing the structure of a network according to a second embodiment of the present invention, wherein the control ATM-WANs are integrated into a single network.

The embodiments are identical, except that the feature that the control ATM-WAN 102 and the user information ATM-WAN 103 of the first embodiment are integrated into a single ATM-WAN 202 in the second embodiment. In FIG. 8, the reference numerals of the components such as the control nodes and the switch nodes are the same as those of FIG. 7 but added by 100, in order to make the correlation between the components easier to understand. For example, the control node processor 100-1 in FIG. 7 is identical to the control node processor 200-1 in FIG. 8.

By forming the networks (the control network 130 and the user information network 131 shown in FIG. 7 and the ATM-WAN 202 which is the integrated network shown in FIG. 8) by WANs, it is possible to flexibly perform telecommunications between arbitrary nodes either dynamically or statically in a variety of ways, such as connection-type telecommunications using PVC or SVC connections, or connectionless telecommunications using packets.

Additionally, by deploying the control nodes and switch nodes over a wide area in the WAN and controlling a plurality of switch nodes with a single control node, there is no need for individually independent switch nodes so that the network as a whole forms a single large switch system with higher flexibility and reliability.

With regard to FIG. 8, since the basic operations are the same as in FIG. 7 except the networks over which control data and user information are transmitted, the explanation shall hereinafter be made with reference to FIG. 7.

Figure 9:
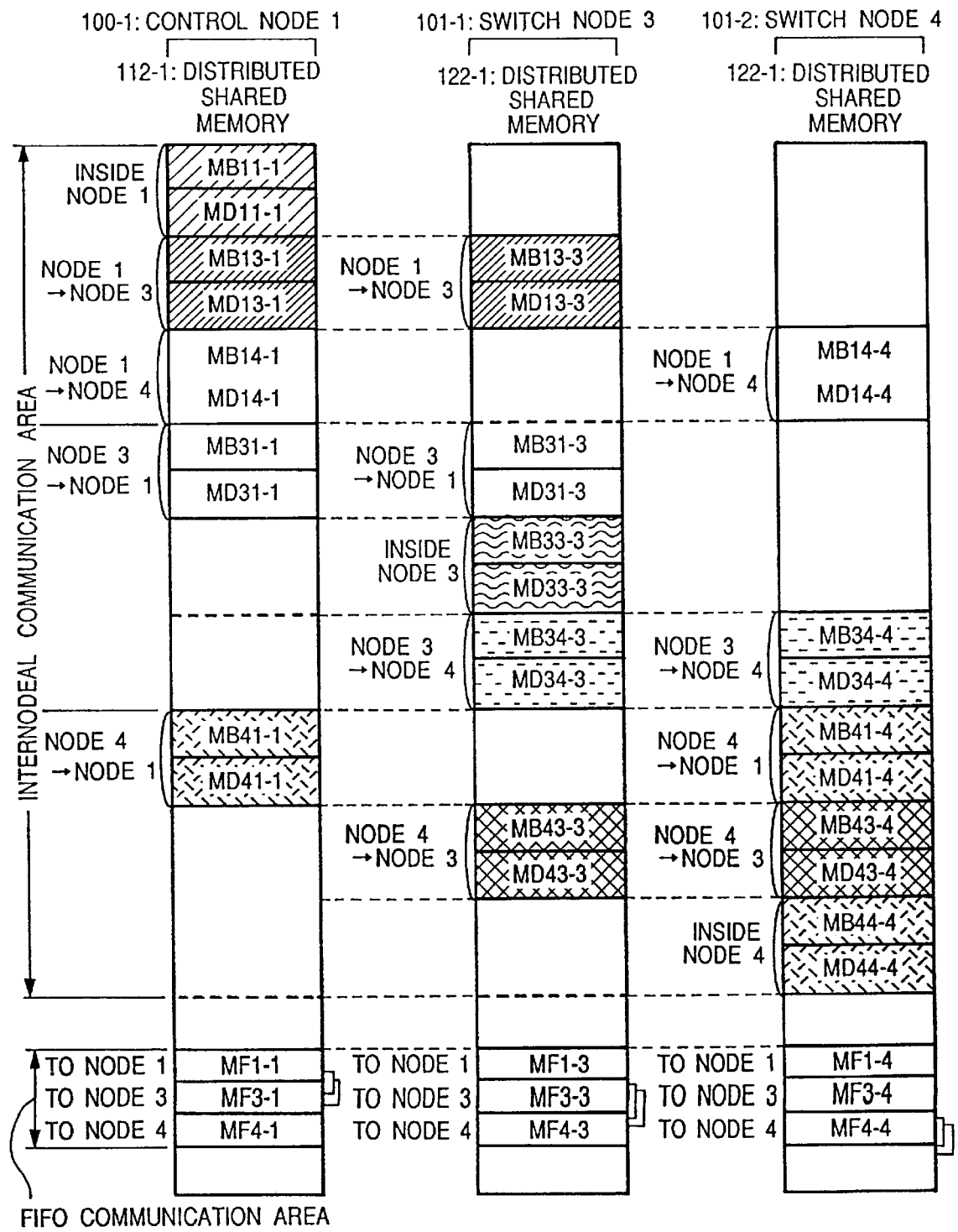
FIG. 9 is a diagram showing an example of the data arrangement in a distributed shared memory in the present invention.

FIG. 9 is a diagram showing an example of the arrangement of data in the distributed shared memory by means of physical address when the control node 1 is controlling the switch nodes 3 and 4.

Each distributed shared memory 112-1, -2 and -3 is assigned the same physical address. The communication area inside the distributed shared memory is roughly separated into (a) an inter-node communication area and (b) a FIFO communication area. In this case, nodes refer to either control nodes or switch nodes. Additionally, sender nodes are control or switch nodes which send messages.

The inter-node communication area stores information transferred within a node or between different nodes. The FIFO communication area stores processing requests transferred between different nodes, in FIFO way.

The inter-node communication area is divided into pairs of send nodes and receive nodes, each divided area being further divided into (1) a message buffer (MB) area having a fixed length for storing messages, and (2) a descriptor (MD) area for storing control information which area used to control message communications.

In FIG. 9, each area in the distributed shared memory is identified by an identifier Aij-k. Here, A indicates the type of area, of which message buffers are indicated by MB, descriptors are indicated by MD and FIFO communication areas are indicated by MF.

The numbers i and j respectively indicate the identification number of the sender node and the identification number of the receiver node, for which the numbers 1, 2, 3, 4 and 5 are respectively assigned to represent control node 1 (100-1), control node 2 (100-2), switch node 3 (101-1), switch node 4 (101-2) and switch node 5 (101-3). However, as an exception to the rule, each FIFO communication area MF is given only the value j and does not have an i. This is because the FIFO communication area is divided in correspondence to the receiver nodes expressed by the value j, each divided area is shared by all of the sender nodes expressed by the value i, thus making the value i unnecessary as information to specify the area.

Additionally, k is an identification number indicating the physical location of the node in which the area is allocated, for which the numbers 1, 2, 3, 4 and 5 are respectively assigned to control node 1, control node 2, switch node 3, switch node 4 and switch node 5 in the same way as i and j.

According to the above-described identification method, for example, MB13-3 represents the area of the distributed shared memory on the switch node 3 (101-1) side of the message buffer from control node 1 (100-1) to switch node 3 (101-1). MD21-2 represents the area of the distributed shared memory on the control node 2 (100-2) side of the descriptor from control node 2 (100-2) to control node 1 (100-1). MF4-1 represents the area of the distributed shared memory on the control node 1 (100-1) side of the FIFO communication area addressed to switch node 4 (101-2). As is clear from FIG. 9, a communication area between different nodes is indicated when i_j.

With regard to the MB and MD areas, areas which are superimposed at the same address on both a sender node and a receiver node form a pair. For example, in FIG. 9, the message buffers MB13-1 and MB13-3 form a pair, which have the same physical address. Each pair is dynamically allocated and released by the distributed operating system of the sender node.

The descriptor MDij-k has a one-to-one correspondence with the message buffer MBij-k. "Correspondence" means that given the top address of a MB (hereinafter referred to simply as the MB address), the descriptor address can be determined; conversely, the MB address can be determined from the descriptor address.

For the purposes of simplifying the description, FIG. 9 shows an example wherein only a single message buffer and descriptor is provided for a single pair of a sender node and a receiver node, but it is general to have a plurality of message buffers and descriptors with respect to each pair of a sender node and a receiver node. As a result, it is possible to send the next message to a node at the same address even before a message buffer and descriptor which are being used are made vacant.

Of the FIFO communication areas in FIG. 9, those which are distributed shared memories of sender nodes (i.e. MFj-k wherein j_k) are composed of conventional RAMs, but the distributed shared memories of receiver nodes (i.e. MFj-k wherein j=k) are composed of FIFO memories. For example, while the FIFO memory area MF1-1 for processing requests addressed to control node 1 in distributed shared memory 112-1 of control node 1 (100-1) is composed of FIFO memory, the FIFO memory area MF1-3 for processing requests addressed to control node 1 in distributed shared memory 122-1 of switch node 3 (101-1) and the FIFO memory area MF1-4 for processing requests addressed to control node 1 in the switch node 4 (101-2) are composed of RAMs.

By combining memory structures in this manner, when two sender side nodes (node 3 and node 4) simultaneously write processing requests to the processing request FIFO areas MF1-3 and MF1-4 for example, copies of the request are simultaneously sent to FIFO communication area MF1-1 of control node 1 (100-1) on the side which reads the processing requests, and these can all be stored in the FIFO memories. Receiver node 1 is capable of detecting processing requests from all of the other nodes, simply by sequentially reading FIFO communication area MF1-1.

Figure 10:
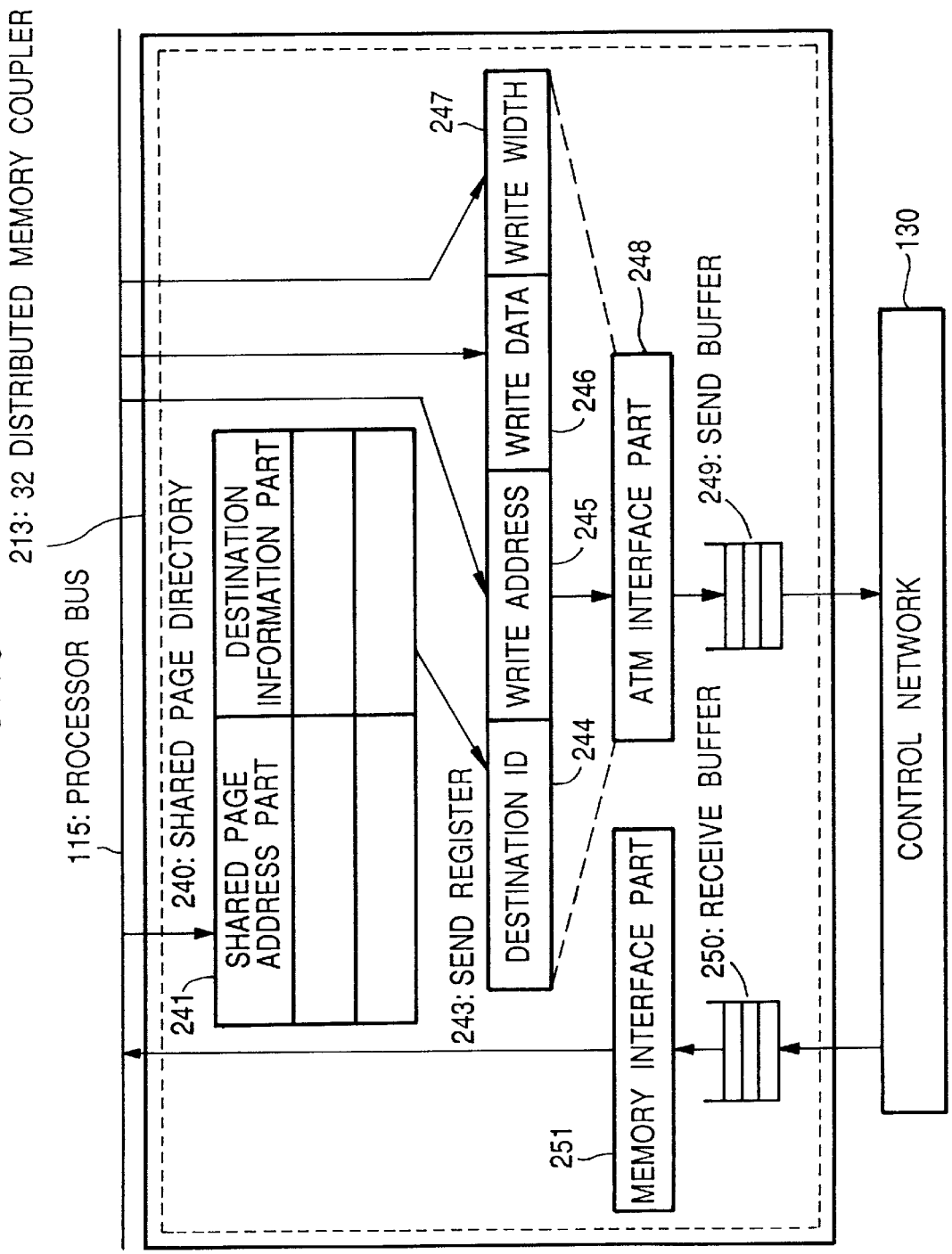
FIG. 10 is a diagram showing the structure of the distributed memory coupler in FIG. 8.

FIG. 10 is a diagram showing the internal structure of a distributed memory coupler.

Since the structure and operation of the distributed memory couplers 113, 213, 122 and 223 are identical between the control nodes 100, 200 and the switch nodes 101, 201, the distributed memory coupler 213 of control node 200 shall be explained here as an example.

In FIG. 10, reference numeral 240 denotes a shared page directory, each entry of which is formed by a pair of a shared page address part 241 and a destination information part 242. The shared page address part 241 stores the addresses of pages shared with other nodes, specifically MB page addresses, descriptor (MD) page addresses and FIFO communication area page addresses. The MB, descriptor and FIFO communication areas described in FIG. 9 are assigned to a different page for each destination node. The destination information part 242 includes ATM cell routing information, specifically VPI and VCI information. The VPI and VCI are two-stage identifiers for specifying the destination of a cell. Since the values of the VPI and VCI are determined when a connection is established between nodes, their values are stored in the distributed memory coupler when a connection is made.

If the processor 210 writes data to the distributed shared memory 212 occurs, the distributed memory coupler 213 compares the write address in the processor bus 215 with each shared page address 241 in the shared page directory 240. If there is a matching address, then the corresponding destination information 242 is extracted and entered into a destination ID field 244 in the send register 243.

The send register 243 retrieves further information including the write address 245, write data 246 and write width 247 from the processor bus 215. These are formed into a send packet which is sent to the ATM cell interface part 248. ATM cell interface part 248 stores a plurality of send packets having the same destination. When the information achieves the amount in a single cell, an ATM cell is formed and sent to the control network 202 via the send buffer 249.

Reference numeral 250 denotes a receive buffer which temporarily stores ATM cells which have been transferred from other nodes through the control network. Reference numeral 251 denotes a memory interface part which decodes ATM cells received from the receive buffer 250, and if an ATM cell is a request to write in the distributed shared memory 212, sends a write address, write data and write width information to the distributed shared memory 212 via the processor bus 215. In the distributed shared memory 212, the data is copied from the sender side distributed shared memory to the receiver side distributed shared memory by performing a write into the designated address.

Destination information for the receiver node is registered in the shared page directory 240 of the sender node side distributed memory coupler with respect to the MB, MD and MF areas. As a result, the write data to the MB, MD and MF areas of the distributed shared memory 212 of the sender node are copied in the forward direction to the MB, MD and MF areas of the distributed shared memory 212 of the receiver node. Additionally, with respect to the MD areas, destination information of the sender node is registered in the shared page directory 240 of the distributed memory coupler of the receiver node. As a result, it is also possible to copy the MD area of the distributed shared memory 212 of the receiver node in the reverse direction to the MD area of the distributed shared memory 212 of the sender node.

Figure 11:
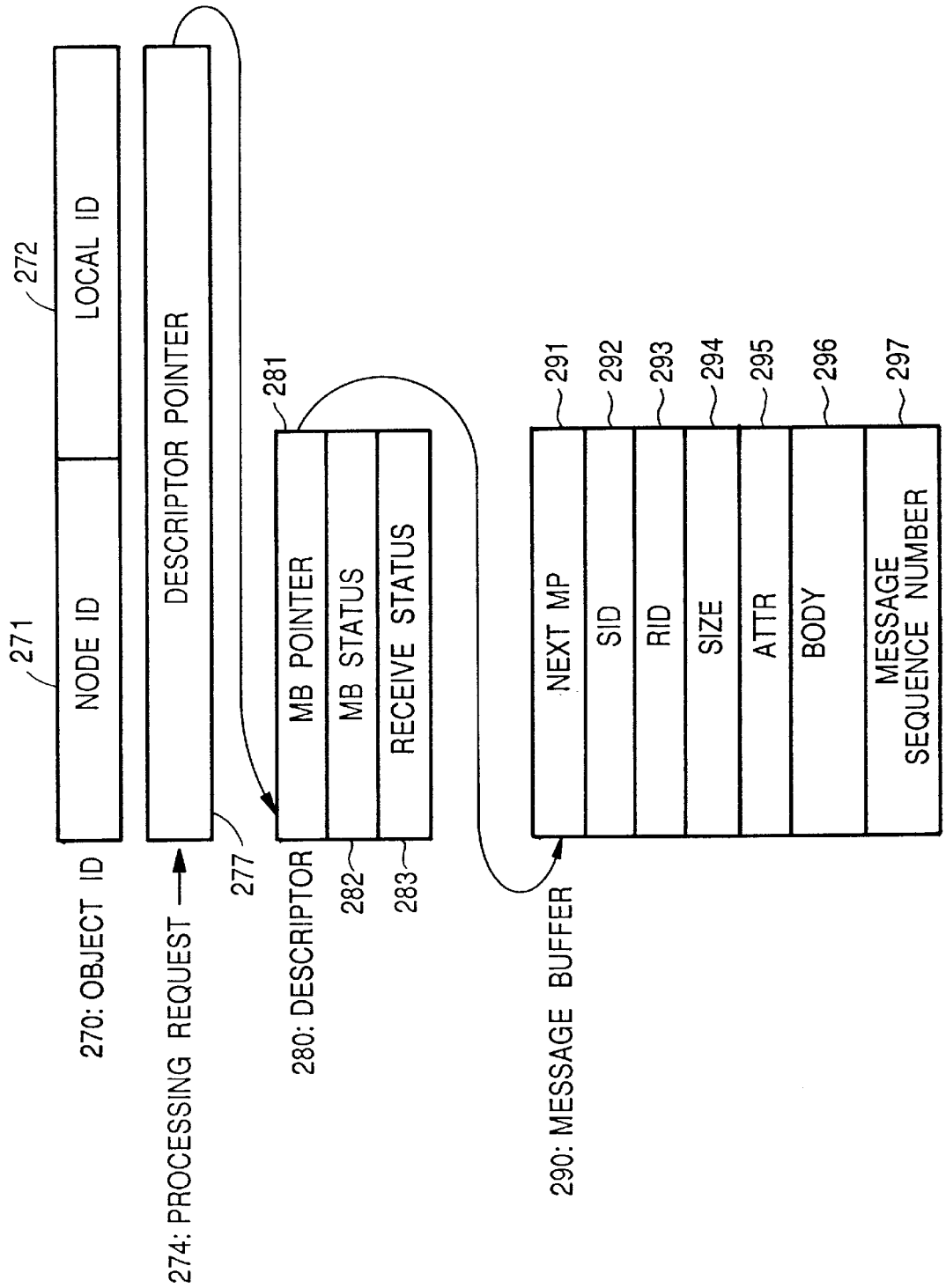
FIG. 11 is a diagram showing various data configurations in the present invention.

FIG. 11 is a diagram showing the structure of each type of data used in the embodiment of the present invention, and the correlation therebetween.

First, reference numeral 270 denotes an object ID which is assigned to each sender objects or receiver objects of application programs, and is uniquely defined in the network. Reference numeral 270 denotes an object ID field configuration, composed of the ID (node ID) 271 of the node in which the object is present and the fields of the local IDs 272 within the node, which is universally identifiable throughout the telecommunication network.

A processing request 274 stored in the FIFO communication area MF is composed of a pointer 277 to a descriptor 280 as shown in FIG. 11.

Additionally, the descriptor 280 is composed of an MB pointer field 281 indicating the top address of the corresponding message buffer, an MB status field 282 indicating the busy/idle status of the message buffer corresponding to the descriptor, and a receive status field 283 which makes a notification from the receiver side to the sender side of the message whether or not the message has been properly received, or the type of error in the case of an error.

The message buffer 290 is composed of a pointer NEXTMP 291 for connecting a message addressed to the receiver object by means of a list structure, a SID field 292 indicating the ID of the sender object which is the source of this message, a RID field 293 indicating the ID of the receiver object which is the destination of this message, a SIZE field 294 indicating the size of the message body (BODY), an ATTR field 295 indicating the attributes of the message, a Body field 296 showing the content of the message, and a message sequence number field 297 containing a sequence number assigned to messages transferred between the same sender and receiver nodes in order to increase the reliability of inter-node communications. Examples of BODYs are switch fabric drive orders and which are sent from control nodes to switch nodes, or switch fabric status data which are sent from switch nodes to control nodes.

At the receiver nodes, a distributed operating system periodically reads the FIFO communication area to detect processing requests 274. By reading out the descriptor 280 by referring to the descriptor pointer 277 contained in the processing request 274, it is possible to obtain the control information of a received message. The distributed operating system on the receiver side is informed of the address of a message buffer 290 by referring to the MB pointer field 281 of the descriptor 280, and is informed of the destination object by referring to the RID field 293 contained therein.

FIG. 12 is a time chart for communication between the control nodes and switch nodes via the control network in the present invention.

Of the execution steps of the processor of FIG. 12, the steps indicated by the boldface lines (for example, step S220: activation of application object [APL object]) are periods in which the distributed operating system is executed in the processor, and the steps indicated by the thin lines (for example, step 223: writing of message) are periods in which application programs such as the sender object or the receiver object are executed.

FIG. 12 illustrates a case wherein a message is transferred through the ATM-WAN 130 from a control node 1 (100-1) where the sender object exists to a switch node 3 (101-1) where the receiver object exists. The MBs used by the sender side are MB13-1 and MB13-3 shown in FIG. 9, the descriptors of which are MD13-1 and MD13-3. Additionally, the processing request FIFO (MF 3-3) addressed to switch node 3 (101-1) in the control node 1 (100-1) is used as the message processing request area. FIG. 12 shows a case wherein the execution of the receiver object starts before the execution of the sender object is completed. The flow of the process shall be explained with reference to the steps (indicated by SXXX) shown in FIG. 12.

(a) Execution in Control Node 1 (100-1)

STEPS S220 and S221

When the distributed operating system of control node 1 (100-1) activates the sender object in step S220, the sender object is executed in step S221. At this time, if there is a need to send a message in order to control the switch node 3 (101-1), the distributed operating system is requested to allocate a MB with specifying the object ID of the receiver object.

STEP S222

The distributed operating system specifies the switch node 3 (101-1) in which the receiver object is present by referring to the receiver object ID, allocates an MB (MB13-1) to be used for communications from control node 1 (100-1) to switch node 3 (101-1), and writes the top address of MB13-1 in the MB pointer field (reference numeral 280 in FIG. 11) into the descriptor MD13-1 and data for indicating the state "In Use" into the MB status field (reference numeral 282 in FIG. 11), at the time t222 in FIG. 12. When information sufficient to fill a single ATM cell accumulates in the sender-side distributed memory coupler 113-1, the information is converted into an ATM cell and transferred through the control network 130 to switch node 3 (101-1). In the switch node 3 (101-1), a copy is made to the MD (MD 13-3) of the address corresponding to the distributed shared memory 122-1 by means of the distributed memory coupler 123-1.

STEP S223

The sender object writes the message into the MB (MB13-1) of the sender-side distributed shared memory in 4-byte units at time t223. When a plurality of 4-byte writes accumulate to achieve the length of one cell, this is transferred through the ATM control network 130 to switch node 3 (101-1). In switch node 3 (101-1), a copy is made to the MB (MB13-3) of the address corresponding to the distributed shared memory 122-1 by the distributed memory coupler 123-1.

STEPS S224 and S225

When the sender object requests a send processing (SEND) to the distributed operating system, the distributed operating system writes a message sequence number into the message sequence number area 297 of message buffer MB13-1 at time t224. The address and data are also sent to switch node 3 (101-1) as an ATM cell and a copy is made to the message sequence number area 297 of the MB (MB13-3) of the address corresponding to distributed shared memory 122-1. Next, when the distributed operating system at the sender side writes a processing request in the processing request FIFO area (MF3-1) on the sender control node 1 side at time t225, the address and data are also sent to switch node 3 (101-1) as an ATM cell, and a copy is made to the processing request FIFO area (MF3-3) of the address corresponding to distributed shared memory 122-1.

Finally, in step S225, an APL object termination process is executed, and the sender object is suspended.

(b) Execution in Switch Node 3 (101-1)

STEPS S230–S233

In FIG. 12, the distributed operating system of switch node 3 (101-1) selects a receiver object as the object to be executed next, and activates this in step S230. In step S231, the receiver object starts its execution and the receiver object requests a receive processing (RECEIVE) to the distributed operating system, and in step S232, the distributed operating system tests whether or not a message has arrived at the receiver object. In the illustrated case, no messages have arrived at this time, so the receiver object is suspended until a message arrives in step S233.

STEP S240

The distributed operating system of switch node 3 (101-1) detects a receive processing request which has been registered in the FIFO processing request area (MF3-3) of the distributed shared memory by periodically reading the processing request FIFO (MF 3-3) addressed to that node, and is informed of the descriptor (MD13-3) address and the MB (13-3) address in the distributed shared memory by following a pointer chain as shown in FIG. 11.

STEPS S250 and S251

The receiver operating system of switch node 3 (101-1) tests whether or not a message for the receiver object has arrived. Since a message has already arrived at the sender side at this time, the message can be immediately read. Then, the message sequence number area 297 of MD13-3 is checked, and after confirming that none of the sequence numbers are missing, the execution of the receiver object is resumed in step S251.

STEP S252

The receiver object reads the message from the MB (MB13-3) at time t252, and executes the corresponding processing, i.e. sending control orders to the switch fabric device.

STEPS S253 and S254

After completing the reading of the message, the receiver object requests the distributed operating system to release the MB (MB13-3). The distributed operating system rewrites the value of the MB status field in the descriptor MD13-3 corresponding to the MB (MB13-3) to "IDLE" at the time t253 in FIG. 12. As a result, a copy is made at the same location (MD13-1) of the sender-side distributed shared memory 112-1 by the distributed memory coupler (123-1,113-1).

Next, the distributed operating system at the receiver side writes a processing request in the processing request FIFO area (MF1-1) addressed to the sender node at the time t255. As a result, a copy is made in the processing request FIFO area (MF1-1) corresponding to the sender-side distributed shared memory 112-1 by the distributed memory coupler (123-1, 113-1).

Finally, in step S254, an APL object termination process is executed, and the receiver object is put on standby.

(c) Processing of Control Node 1 (100-1)

STEP S260

The distributed operating system of the control node (100-1) periodically reads the processing request FIFO (MF1-1) addressed to that node at time t260, and checks for the existence of a processing request. When a processing request is detected, the address of the descriptor (MD13-1) of the distributed shared memory is extracted by the pointer chain shown in FIG. 11, and the corresponding MB (MB13-1) is released.

Above paragraphs explained a method of transferring a switch fabric drive order message from a control node to a switch node.

When the control node is to receive switch fabric scan results from the switch node, this is achieved by combining a request message and a reply message. First, switch fabric scan requests are sent from a control node to a switch node. Subsequently, the switch node allocates the message buffer MB31-1 addressed to the control node, writes the scan result message and returns the reply message to the control node.

The above-mentioned message communication interface can be applied not only between the control nodes and switch nodes, but also between control nodes, between switch nodes, within control nodes and within switch nodes. For example, in the case of intra-node communications wherein a sender object and a receiver object exist on the same control node (100-1), message communications can be performed by exactly the same method as with inter-node communications for the purposes of the sender/receiver object by combining the message buffer MB11-1 of FIG. 9 and the timing procedure of FIG. 12. Hence, the distribution transparent facilities can be achieved which allows the same interface to applications without depending on whether the communications are intranodal or internodal by means that the objects which are uniquely identifiable within the network are loosely coupled by a logical interface of messages, and that the distributed operating system and the distributed memory coupler support message communications between these objects.

By achieving distributed transparent facilities, application programs conventionally located on different nodes can easily be located on the same control node without any particular modifications. In other words, hardware resources or software resources known as objects can be distributed throughout the network by incorporating distributed transparent facilities into control nodes or switch nodes, making it possible to send and receive messages using the same methods without any dependence on the locations of the objects by transferring messages to destination nodes based on identifiers contained in messages. Then, the objects on a single switch node can be distributed over the network without making modifications, thereby making is easier to separate the control and switch functions.

Specifically, by incorporating the above-described distributed transparent facilities, a conventional network configuration wherein the distribution of applications must be considered and the shifting of functions is difficult can be changed so that the following functions become more flexible as shown below:

(a) service switching functions (SSF) which have conventionally been performed on service switching nodes, i.e. basic service functions for controlling connections of the switch fabric in real-time, and (b) service control functions (SCF) which have conventionally been performed by service control nodes, i.e. functions for achieving high-degree service functions by coordination with SSFs, are integrated onto the same control nodes without altering the SSF and SCF application programs, as shown in FIG. 13.

Additionally, while the functions of operation systems for non-real-time management of telecommunication networks composed of nodes containing SSFs and SCFs have conventionally been built into systems different from the nodes containing SSFs and SCFs, these can be integrated onto the same control nodes without altering the application programs of the operation system, as shown in FIG. 13.

That is, by forming a distributed network configuration incorporating distributed transparent facilities, the configuration can be changed so that the distribution is easily concealed, functions such as SSFs and SCFs are easily shifted and these functions are easily developed. In FIG. 13, those portions which correspond to portions of FIG. 1 are given the same reference numerals, and their explanation is omitted.

Furthermore, as a result of interconnecting the control network by an ATM-WAN, when a node goes into failure, switching to alternative node can be promptly performed. For example, in FIG. 7, a control node 100-1 controls switch nodes 101-1 and 101-2. Additionally, a reserve of control node 100-1 is assigned to control node 100-2. When control node 100-1 goes into failure, in control network 130 of FIG. 7, the reserve control node 100-2 newly establishes an SVC connection with the control node 100-1, so as to take over the control data and status data from the control node 100-1 within the allowable range.

As a method for passing over the control data and status data, it is possible to, pass the data at high speed by performing a copy between the distributed shared memories (112-1, 112-2) using the distributed memory couplers 113-1 and 113-2 of both control nodes. Of course, in order to make this type of passing over, the processor 110-1, distributed memory coupler 113-1 and distributed shared memory 112-1 of the disabled control node in failure must still be intact.

Next, the control node 100-2 establishes a new connection by means of an SVC with switch nodes 101-1 and 101-2 which the control node 100-1 had been controlling until then, and thereafter the control node 100-2 controls the switch nodes 101-1 and 101-2.

While a control node 100-2 is used as the reserve node in the above-given description, since the switch nodes also have small-scale processors, a switch node (for example, switch node 101-3 in FIG. 7) can be assigned to be a reserve node so as to perform all or a part of the functions of the control nodes as a substitute. Thus, the entire network can economically and sufficiently maintain reliability by providing reserve nodes for the entire network instead of providing reserve devices separately for each node.

Consequently, functions which are conventionally only capable of being controlled within solitary switch nodes can be expanded throughout the entire network. Additionally, a load which has overflown from a node can be dynamically distributed to other nodes, and even if a node is disabled, another node can serve as a replacement so as to prevent the overall network from being in failure.

While the above description illustrates an example wherein the connections of the switch nodes and the control nodes are made by connection-type communications such as PVCs and SVCs in the control network 130 of FIG. 7 or the ATM-WAN 202 which is the integrated network of FIG. 8, the invention is not restricted thereto, so that communications can also be made by connectionless communications using packets.

As explained above, according to the present invention, (1) the control nodes and switch nodes are connected by a control network, and arbitrary connections can be established as needed, as a result of which a network based on distributed control which is economical and highly flexibility can be constructed even if there is a large number of switch nodes to be controlled.

Additionally, (2) by loosely connecting objects which are universally identifiable in the network by a logical interface using messages, it is possible to offer an interface which is identical for the purposes of the application to be achieved without depending on whether the communications are internodal or intranodal. That is, since distributed transparency is achieved, the functions of the nodes can be easily altered and the location of the application objects can be easily changed from node to node, thus providing high flexibility. Furthermore, a comprehensive distributed network integrating a transmission control system, a advanced function control system and a management system can be achieved in accordance with increased processing power of processors.

Furthermore, (3) the above-described network based on distributed control can be easily constructed due to the achievement of efficient message communications, by means of a network-wide shared memory space and a communication structure between the distributed shared memories.

While the present invention has been described with reference to an embodiment comprising an switch node system inside a network, the present invention is not restricted thereby and can be widely applied to various types of network devices such as routers with switches (for example, IP [International Protocol] switches).

What is claimed is:

1. A telecommunication network based on distributed control, comprising:

a plurality of switch nodes having switch fabric devices containing connection-oriented switches for exchanging user information between subscriber lines and trunk lines by connection control operations, and signal devices for sending and receiving control signals through said subscriber lines and said trunk lines;

a plurality of control nodes for executing connection control operations for said switch nodes by sending and receiving control messages with said switch nodes;

a control network for performing message communications between said switch nodes and said control nodes; and a user information network for transferring said user information;

wherein said control network connects said switch nodes and said control nodes by connection-oriented or connectionless communications, said control nodes and said switch nodes send and receive messages for communicating with other nodes through said control network, and each of said control nodes controls a plurality of switch nodes by delivering messages to the destination nodes, specified by routing information in said messages; and wherein said control network and said user information network are integrated into a single network.

2. A telecommunication network based on distributed control in accordance with either of claim 1, wherein reserve control nodes are provided to substitute for all or a part of the functions of said control nodes;

wherein each of said control nodes controls one or a plurality of switch nodes in a normal state; and when said control nodes are disabled, connections are established between said reserve control nodes and said switch nodes through said control network so as to enable said reserve control nodes to control said switch nodes as a substitute.

3. A telecommunication network based on distributed control in accordance with claim 2, wherein reserve switch nodes having the functions of switch nodes and having functions for substituting for all or a part of the functions of the control nodes are provided; and said reserve switch nodes are capable of substituting for all or a part of the functions of disabled control nodes.

4. A telecommunication network based on distributed control in accordance with claim 2, wherein said control nodes and said reserve control nodes each have a distributed shared memory and means for copying between distributed shared memories;

the distributed shared memories of said control nodes and the distributed shared memories of said reserve control nodes share the same memory space; and information is handed over from said control nodes to said reserve control nodes by copying messages written in the distributed shared memories of said control nodes into the distributed shared memories of said reserve control nodes by said copying means.

5. A telecommunication network based on distributed control in accordance with claim 1, wherein reserve switch nodes having the functions of switch nodes and having functions for substituting for all or a part of the functions of the control nodes are provided; and said reserve switch nodes are capable of substituting for all or a part of the functions of disabled control nodes.

6. A telecommunication network based on distributed control, comprising:

a plurality of switch nodes having switch fabric devices containing connection-oriented switches for exchanging user information between subscriber lines and trunk lines by connection control operations, and signal devices for sending and receiving control signals through said subscriber lines and said trunk lines;

a plurality of control nodes for executing connection control operations for said switch nodes by sending and receiving control messages with said switch nodes;

a control network for performing message communications between said switch nodes and said control nodes; and a user information network for transferring said user information;

wherein said control network connects said switch nodes and said control nodes by connection-oriented or connectionless communications, said control nodes and said switch nodes send and receive messages for communicating with other nodes through said control network, and each of said control nodes controls a plurality of switch nodes by delivering messages to the destination nodes, specified by routing information in said messages;

wherein software for controlling said switch nodes by said control nodes is object-oriented and composed of a plurality of objects, and is executed by sending and receiving messages between said objects; and wherein each of said control nodes and said switch nodes is provided with means for transferring messages in the uniform way between objects through said control network to the destination node if said destination mode is different from the message-sender node or directory to its own node if said destination node matches the message sender-node through said control network to destination nodes, based on identifiers contained in said messages.

7. A telecommunication network based on distributed control in accordance with claim 6, wherein said control nodes have a service switching function of controlling connections in real-time;

a service control function of cooperating with said service switching function to achieve intelligent network service; and an operation system function of managing the network in non-real-time.

8. A telecommunication network based on distributed control, comprising:

a plurality of switch nodes having switch fabric devices containing connection-oriented switches for exchanging user information between subscriber lines and trunk lines by connection control operations, and signal devices for sending and receiving control signals through said subscriber lines and said trunk lines;

a plurality of control nodes for executing connection control operations for said switch nodes by sending and receiving control messages with said switch nodes;

a control network for performing message communications between said switch nodes and said control nodes; and a user information network for transferring said user information;

wherein said control network connects said switch nodes and said control nodes by connection-oriented or connectionless communications, said control nodes and said switch nodes send and receive messages for communicating with other nodes through said control network and each of said control nodes controls a plurality of switch nodes by delivering messages to the destination nodes, specified by routing information in said messages;

wherein each of said control nodes and said switch nodes has a distributed shared memory and means for copying between distributed shared memories;

wherein the distributed shared memories located in said control nodes and the distributed shared memories located in said switch nodes share the same memory space;

wherein messages are exchanged between said control nodes and said switch nodes by copying a message written in a distributed shared memory of a control node or a distributed shared memory of a switch node into another distributed shared memory through said control network by said means for copying; and wherein reading said message from the distributed shared memory of a destination node of said message.

9. A telecommunication network based on distributed control, comprising:

a plurality of switch nodes having switch fabric devices containing connection-oriented switches for exchanging user information between subscriber lines and trunk lines by connection control operations, and signal devices for sending and receiving control signals through said subscriber lines and said trunk lines;

a plurality of control nodes for executing connection control operations for said switch nodes by sending and receiving control messages with said switch nodes;

a control network for performing message communication between said switch nodes and said control nodes; and a user information network for transferring said user information;

wherein said control network connects said switch nodes and said control nodes by connection-oriented or connectionless communications, said control nodes and said switch nodes send and receive messages for communicating with other nodes through said control network, and each of said control nodes controls a plurality of switch nodes by delivering messages to the destination nodes, specified by routing information in said messages;

wherein reserve switch nodes having the functions of switch nodes and having functions for substituting for all or a part of the functions of the control nodes are provided; and wherein said reserve switch nodes are capable of substituting for all or a part of the functions of disabled control nodes.

10. A telecommunication network based on distributed control in accordance with claim 9, wherein said reserve switch nodes each have a distributed shared memory and means for copying between distributed shared memories;

the distributed shared memories of said control nodes and the distributed shared memories of said reserve switch nodes share the same memory space; and information is handed over from said control nodes to said reserve switch nodes by copying messages written in the distributed shared memories of said control nodes into the distributed shared memories of said reserve switch nodes by said copying means.

11. A telecommunication network based on distributed control, comprising:

a plurality of switch nodes having switch fabric devices containing connection-oriented switches for exchanging user information between subscriber lines and trunk lines by connection control operations, and signal devices for sending and receiving control signals through said subscriber lines and said trunk lines;

a plurality of control nodes for executing connection control operations for said switch nodes by sending and receiving control messages with said switch nodes;

a control network for performing message communications between said switch nodes and said control nodes; and a user information network for transferring said user information;

wherein said control network connects said switch nodes and said control nodes by connection-oriented or connectionless communications, said control nodes and said switch nodes send and receive messages for communicating with other nodes through said control network, and each of said control nodes controls a plurality of switch nodes by delivering messages to the destination nodes, specified by routine information in said messages;

wherein reserve control nodes are provided to substitute for all or a part of the functions of said control nodes;

wherein each of said control nodes controls one or a plurality of switch nodes in a normal state;

when said control nodes are disabled, connections are established between said reserve control nodes and said switch nodes through said control network so as to enable said reserve control nodes to control said switch nodes as a substitute;

wherein reserve switch nodes having the functions of switch nodes and having functions for substituting for all or a part of the functions of the control nodes are provided;

wherein said reserve switch nodes are capable of substituting for all or a part of the functions of disabled control nodes;

wherein said control nodes, said reserve control nodes and said reserve switch nodes each have a distributed shared memory and means for copying between distributed shared memories;

wherein the distributed shared memories of said control nodes and the distributed shared memories of said reserve control nodes and said reserve switch nodes share the same memory space; and wherein information is handed over from said control nodes to said reserve control nodes and said reserve switch nodes by copying messages written in the distributed shared memories of said control nodes into the distributed shared memories of said reserve control nodes and said reserve switch nodes by said copying means.

* * * * *